United States Patent [19]
Seidenfaden

[11] 3,711,082
[45] Jan. 16, 1973

[54] FASTENING EQUIPMENT WITH LOW PRESSURE SUCTION

[75] Inventor: Heinz Seidenfaden, Varel/Oldb., Germany

[73] Assignee: Vereinigte Flugtechnische Werke-Fokker GmbH, Bremen, Germany

[22] Filed: April 28, 1970

[21] Appl. No.: 32,581

[30] Foreign Application Priority Data

May 9, 1969 Germany.....................P 19 23 833.6

[52] U.S. Cl. .......................269/21, 51/235, 269/296
[51] Int. Cl. .............................................B25b 11/00
[58] Field of Search............29/493, DIG. 44; 51/235; 269/21

[56] References Cited

UNITED STATES PATENTS

| | | | |
|---|---|---|---|
| 2,782,574 | 2/1957 | Copold | 269/21 X |
| 3,131,476 | 5/1964 | Seher | 51/235 X |
| 2,133,518 | 10/1938 | Huebner | 269/21 X |
| 3,486,441 | 12/1969 | Hillman et al. | 269/21 X |

OTHER PUBLICATIONS

Kitchingham, R. Producing Light–Alloy Aircraft Components by High Speed Routing, In Machinery, Vol. 97, p. 596–598, Sept. 14, 1960, TJ1M17.

Primary Examiner—Robert C. Riordon
Assistant Examiner—Neil Abrams
Attorney—Smyth, Roston & Pavitt

[57] ABSTRACT

A fastener plate, serving as machine tool table top or for placement on such a table, is provided with an array of bores interconnected by open channels. The bores are connected to a low pressure suction device. Sealing strips are placed in selected channel portions to delineate a closed boundary. Bores outside of the boundary are selectively plugged, those within are not, so that an object covering that delineated area is sucked onto the fastener plate for holding and positioning. Additional bores are provided for indexing or bolting auxiliary holders and mounting elements to the plate. Examples for such mounting elements are in detail and provided to extend suction fastening to accomodate particularly contoured and/or oriented parts to be held.

16 Claims, 31 Drawing Figures

FASTENING EQUIPMENT WITH LOW PRESSURE SUCTION

The present invention relates to equipment for positioning, position locking and fastening work pieces, work piece holders, or the like, upon a table of a machine tool, using particularly low pressure for obtaining fastening by suction.

The known devices for fastening and position locking of work pieces to a machine tool table, or the like, are rather complicated; they require a long time and particular high skill to operate. The problem solved by the invention is to provide and to develop fastening equipment which is comparatively simple constructed and which is easy to operate, particularly in that a work piece can be fastened in a desired position, without requiring particularly skilled people for that particular operation. It is particularly important to provide structure for fastening rather thin-walled work pieces to a machine tool, for properly positioning them for further working.

In accordance with the preferred embodiment of the invention, it is suggested to provide a particularly constructed plate, that is either the machine tool table itself or a support plate for placement on a machine tool table. A first plurality of regularly distributed bores is provided for position-fixing of a part to be secured to the plate; these bores from an array or the like. Additionally, a second plurality of likewise regularly distributed bores is provided, interdigitized with the bores of the first plurality, but separated therefrom. The bores of the second plurality communicate with a conduit system in or on the plate that is connected to a low pressure or "vacuum" system. The bores of the second plurality terminate on the plate's surface in a plurality of open but interconnected channels or grooves.

The aforementioned grooves or channels may selectively receive sealing means such as sealing strips, to delineate a closed boundary for an area, approximating the contour of the bottom of an object to be fastened. Bores of the second plurality outside of the delineated area are closed, those within remain open. This way, a particular space can be defined between the bottom of the part to be fastened, and when seated on the projecting sealing strip, and that portion of the plate delineated by the sealing means. That space is under low pressure to cause suction, whereby the part to be fastened is urged against the sealing strip and fastened therewith to the plate. The sealing strips may be completely pressed into the channels by the suction so that the part to be fastened rests on the particular plate, suction continuing to be effective through the open channels and unplugged bores within the delineated area.

As the fastener plate, equipped with bores and grooves, as aforedescribed, is to have rather universal utility, it is advisable to provide the channels in two groups. The channels of a group run parallel to each other, but the two groups are orthogonally arranged, and the bores communicating with the low pressure system are arranged respectively in the intersections. The fastening plate may be provided of plastic material in which case inserts made of metal are provided in order to establish bores and channels, directly or by spacing between them. Preferably, pneumatically operable pistons are provided in the plate, near the outer edges thereof, for lifting a work piece off the plate.

A particular work piece may be fastened directly to the plate by low pressure suction acting on the bottom or the work piece. However, the basic construction, as described in the foregoing, can be supplemented by means of additional fastening and mounting elements and additional bores may be provided to secure these auxiliary mounting elements on the fastener plate and in desire position thereon. The bores of the first plurality may define a matrix for indexing. Particular holder or carrier pins may be mounted in fixed relation to that matrix; alternatively, holder pins may be mounted for selective displacement in one or two directions corresponding to fine scale positioning in fraction of unit spacing as defined by the matrix. It may also be necessary to provide and to accommodate additional, particularly contoured, and/or particularly oriented holders, support and propping elements. These holders may be placed directly on the fastener plate, or they are mounted on an intermediate carrier plate that is maintained in position on the fastener plate by the suction operation. These auxiliary elements may likewise be connected for providing low pressure suction of objects against the particularly contoured and/or oriented face. For this, minimum size channels for selectively receiving sealing means are provided to establish suction and surface-to-surface contact between work piece and support element analogously to low pressure suction as provided by the principle plate. A universally pivotable carrier element with adjustable height may be provided as one of the auxiliary mounting elements. The carrier element is on a pin that is permitted to slide in a bore, and may be connected to the suction system.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 12 is a section view through a fastener plate as in the previous figures, but provided with additional support and fastening means for securing, fastening and positioning of work pieces, samples, models or the like;

FIGS. 13 and 13a, respectively, are top views of the devices shown in FIGS. 12 and 12a;

Figure 1:
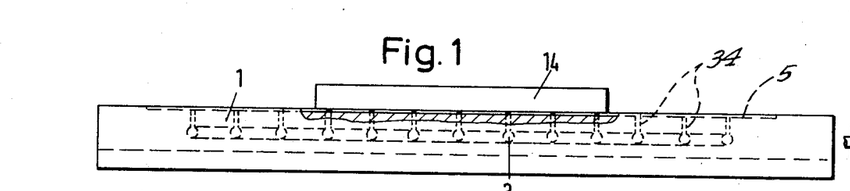
FIG. 1 is a front view of a machine tool table constructed in accordance with a first example of the preferred embodiment of the invention, whereby particularly the table itself is provided as support plate onto which a work piece to be worked is fastened.
Figure 2:
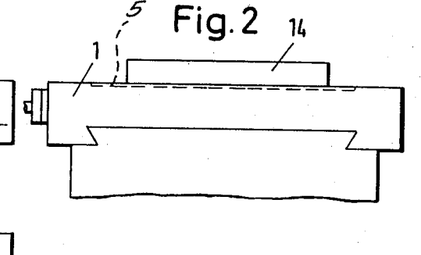
FIG. 2 is a side elevation of the device shown in FIG. 1.
Figure 3:
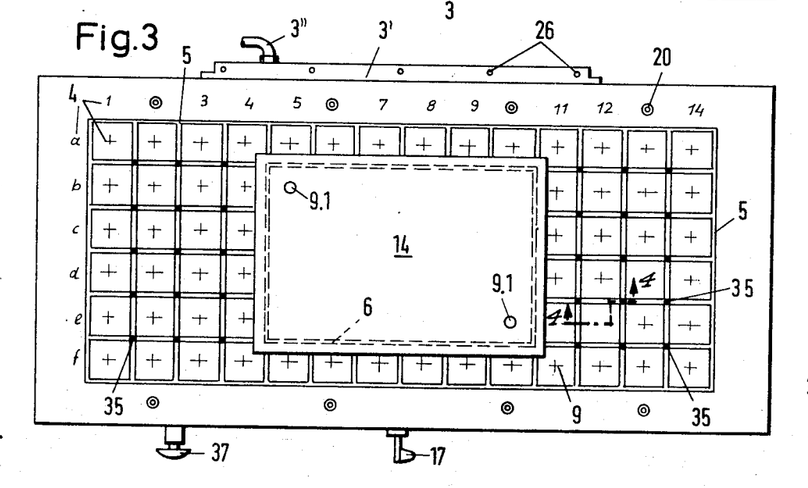
FIG. 3 is a top elevation of the device shown in FIGS. 1 and 2.

Proceeding now to the detailed description of the drawings, it is pointed out first that FIGS. 1 through 3 illustrate a machine tool table 1 the top thereof being a plate constructed in accordance with the features of the present invention, while FIGS. 5 through 17 illustrate a fastening plate 2 that is a separate unit but which may be placed on and secured to a conventional machine tool table. The specific structural features that make up the invention, are similar in either case. Therefore, the specific features described next, pertain either to machine tool table 1 in FIGS. 1 through 4, or to separate plate 2 in FIGS. 5 et seq.

The particular plate, such as the top of table 1 or the fastener plate 2, is provided with a plurality of vertically extending bores 9. These bores are regularly arranged and equidistantly spaced in and along two orthogonal directions defining a horizontal coordinate system. The distance of the bores from each other can be regarded as unit distance within that coordinate system. From a different point of view, these bores 9 may be arranged in a matrix pattern, the columns thereof being identified by 1, 2, 3 etc., the rows being identified by a, b, c etc.

Each bore 9 has two portions (see FIG. 4); the respective upper part establishes a fitting or indexing bore in order to establish a particular position of work pieces or of auxiliary fastening elements. The lower portion of each bore is threaded and of smaller diameter than the upper portion. Thus, there is ledge on which a fitting pin inserted in the upper portion may rest. The threaded portion, of course, permits bolting of equipment to the plate; unthreaded indexing pins should normally not reach into the threaded portion of a bore 9.

The regular matrix pattern of bores 9 is traversed by an array of horizontally extending grooves or channels 5. Two groups of channels can be distinguished. A first group runs parallel to and in between the rows as defined by bores 9, a second group of channels runs parallel to and in between the columns of the bores. Of course, the channels of the first group intersect the channels of the second group, and a portion of an channel between two intersections can be regarded as a channel section. As can be seen, each of the bores 9 is circumscribed by four of these channel sections.

Figure 4:
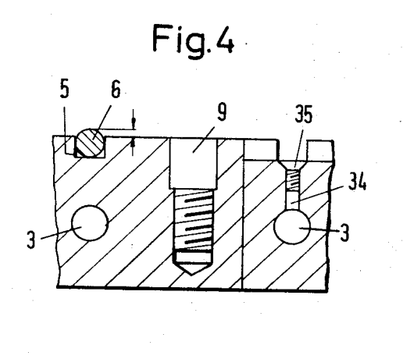
FIG. 4 is a section view along lines 4—4 of FIG. 3.

The grooves or channels 5 are open and they may receive sealing elements, such as strips 6, which are squeezed into the respective channels, but project therefrom to some extent, in up-direction and by a particular distance, as shown by double arrow in FIG. 4. Rules for placing the sealing strips into particular grooves will be described below.

In each intersection of the channels there is a vertical bore 34. These bores 34 lead to ducts 3 in the interior of table 1 or of plate 2 or in the lower surface thereof. Each one of these bores 34 can be closed by a stopper 35. Preferably, the bores 34 are threaded and the stoppers or plugging elements 35 are actually threaded, bolt-like elements, that can be threaded in to bores 34, thereby interrupting the communication from the duct system 3 through that particular bore 34 in that intersection of two channels 5. In each case, the system of ducts 3 leads to a manifold 3' that connects the ducts to a conduit 3'' leading to a vacuum pump or the like to establish low pressure in ducts 3, effective externally through bores 34 that are not closed. Manifold 3' has additionally outlet openings 26 that are normally closed, however, they permit connection to conduits which, in turn, lead to auxiliary fastening elements that have to be depressurized.

The sealing strips 6 are individually placeable and are so placed in particular portions of some of the channels 5 to define a closed boundary, delineating an area on the fastener plate. Bores 34 within that area are not closed (at least not all of them, usually none of them); those bores 34 outside of that delineated area are all closed by stoppers 35.

The dimensions and contour of that boundary defined by sealing strips should be chosen to follow the contour of the bottom of the object to be fastened so that that bottom covers the entire delineated area; no part of that area should be uncovered. As low pressure suction is applied through open ducts 34, the object is urged towards the plate 1 or 2 and may actually be seated thereon, completely pressing the sealing strips into the respective channels. Suction is maintained through low pressure in the sections of the channels which are (a) within the delineated area and (b) in communication with at least one unplugged bore 34.

Near the margin of table 1 or plate 2 there are provided pistons 20 equipped with balls or rolls and being pneumatically operable. These pistons are provided to permit lifting of the work pieces in case they extend that far to facilitate their removal from table 1 or plate 2.

The side of table top 1 or of plate 2, opposite to manifold 3', is provided with two switches. One of these switches can be operated by a lever 17; the other switch can be operated by a pushbutton 37. Details are not shown but it is fully understandable, that by operation of the lever 17, the switch associated therewith, is operated to cause pressure to be applied to the pistons 20, causing them to be raised. Operation of pushbutton 37 repressurizes the duct system 3 so that any object on the plate or table can be removed therefrom.

Figure 27:
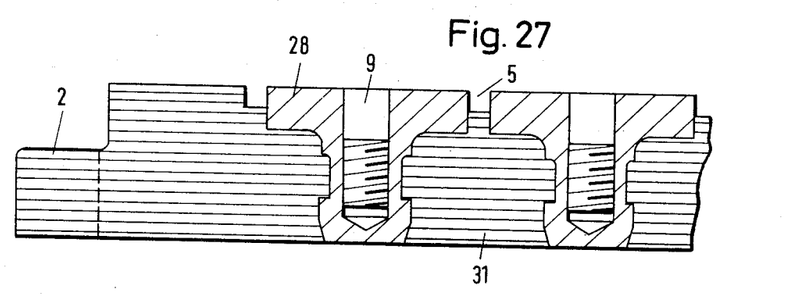
FIG. 27 is a section view through a part of a fastener plate, made of casted or molded plastic such as resin.
Figure 28:
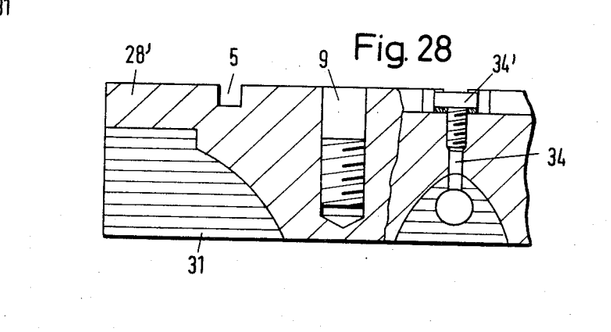
FIG. 28 is a section view through structure modified from FIG. 27.
Figure 29:
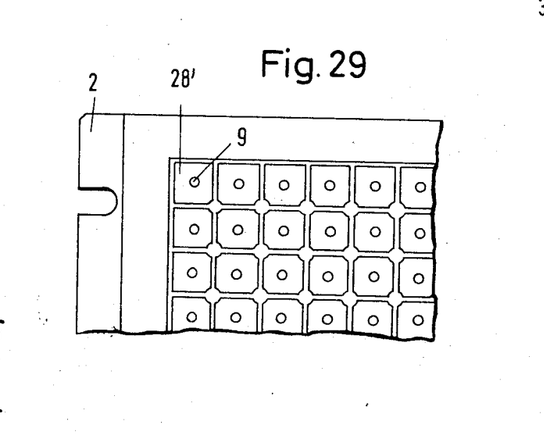
FIG. 29 is a top view of a portion of the plate shown in FIG. 28.

It should be mentioned at this point that, for example, and as shown in the embodiments of FIGS. 9, 11, 13, 15, additional bores 25 can be provided in fastener plate 2, which bores can be used for fastening auxiliary elements that project beyond the top plane of the fastener plate. As shown in other embodiments, such as FIGS. 27, 28 and 29, plate 2 may be made from a nonmetallic work piece 31 but there are provided inserts 28 and 28' made of metal. These inserts 28 are provided particularly to establish individually the bores 9 and their particular dimensions. The inserts have dimensions, so that the gap in between adjacent one defines the channels 5. The particular inserts 28', shown in FIGS. 28 and 29, however, are provided to directly include channels 5, including also bores 34 in addition to the bores 9, whereby bores 34 are threaded to receive threaded plugs 34'.

Proceeding now to particulars of the several examples, turn first to FIGS. 1 through 4. It can readily be seen that a particular flat work piece 14 is disposed on table 1. Sealing elements 6 are placed in those channels of the channel system which are underneath the work piece 14, but they are as close to the edges of the bottom thereof as possible. This way, a particular, in this case, rectangular area is delineated on table 1 underneath the main portion of the work piece 14. All openings 34 outside of this area are closed, those covered by work piece 14 and within the boundary as defined by sealing 6 are open. The portions of channels 5 in communication with unplugged bores 34 are maintained at low pressure, sucking plate 14 to be seated on table 1, and maintained in that position as long as needed.

The work piece plate 14, as shown in FIGS. 1, 2 and 3, is additionally provided with two bores 9.1 and 9.2. In particularly, bore 9.1 thereof is disposed above the bore 9 that is identified by coordinate values or matrix point b 5. Bore 9.2 in plate 14 registers with the bore 9 in table 1, having a coordinate value or matrix point e 10. Thus, the plate 14 has a particular indexing position, and further operations may take that into account.

Figures 5, 6, 7:
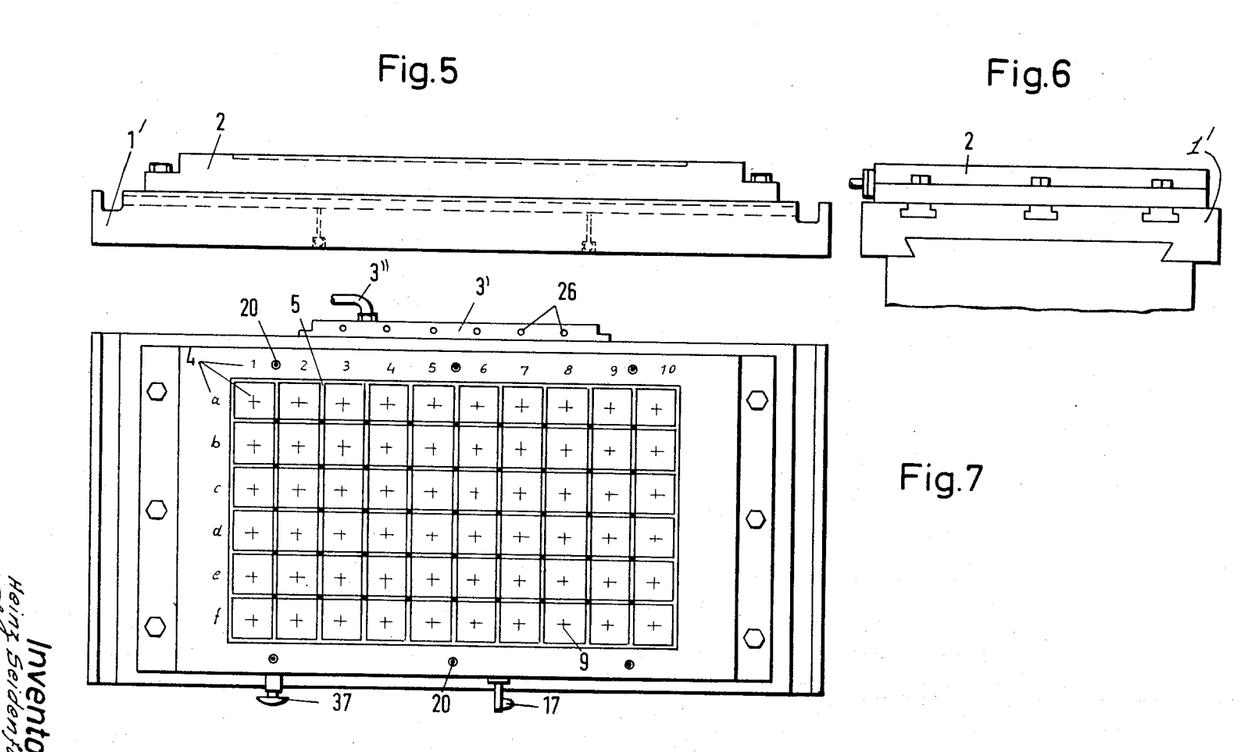
FIG. 5 is a front view of a fastener and support plate constructed in accordance with a second example of the invention, the plate being shown secured onto a conventional machine tool table.
FIG. 6 is a side elevation of the device shown in FIG. 5.
FIG. 7 is a top elevation of the plate shown in FIGS. 5 and 6.

Little additional explanation is needed for FIGS. 5 to 7; they show a plate 2 constructed as aforedescribed and including all of the connections (manifold 3' etc.). The plate 2 may simply be bolted to a conventional machine tool table 1', as supplementing equipment. The manifold may be provided separately and bolted separately to the table. The plate shown in FIGS. 5, 6 and 7 has different dimensions, its coordinate system runs from a through f and 1 through 10, to accommodate the dimensions of the table.

Figures 8, 9:
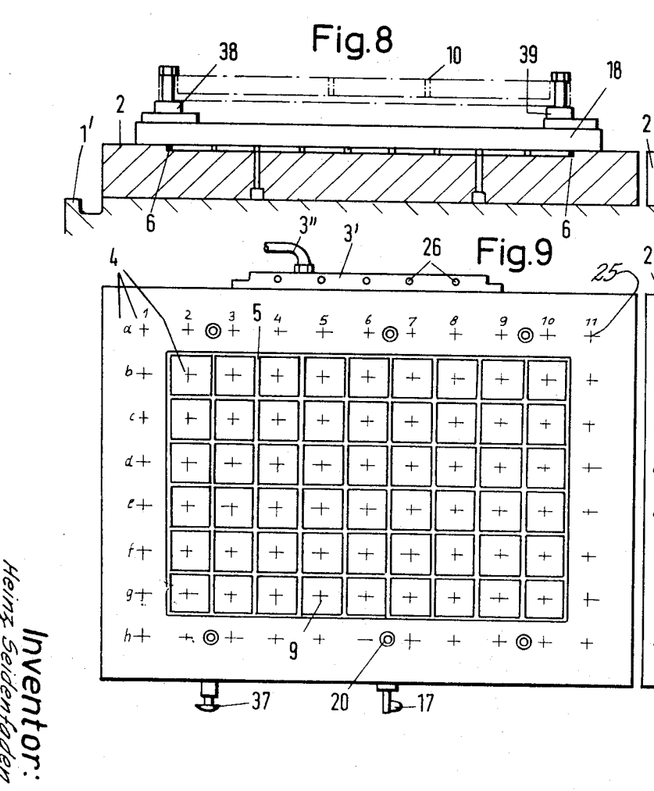
FIG. 8 is a section view of an arrangement similar to FIG. 5, shown partially in section view and with inclusion of additional support structure on the fastener plate.
FIG. 9 is a top elevation of the plate shown in FIG. 8.

The FIGS. 8 et seq. serve to illustrate versatility of the invention in the employment of various types of auxiliary fastening equipment. Proceeding now to the description of FIGS. 8 through 11, there is shown a slight modification in the construction of plate 2, in that the system of channels 9 is, so to speak, lined by two rows and two columns of bores 25. The coordinate system or the entire matrix has rows a through h and columns 1 through 11. The fastener plate 2 here is mounted on the machine tool table 1 and supports a particularly provided holding or support plate 18 which is provided with bores 9a (see FIG. 11) that register with the bores 9 in the fastener plate 2 but do not necessarily communicate therewith.

Positioning and mounting elements 38 and 39 are mounted to plate 18, for example, they are bolted thereto. Elements 38 and 39 in FIG. 8 hold a work piece 10. The positioning and mounting element 38 has a relatively small base plate that may be bolted to four bores 9. The base plate has a carrier pin secured thereto and projecting upwards therefrom. That pin defines a particular vertical axis which, in turn, defines a particular point on the mounting plate 18 to permit particular orientation. The positioning element 39 has a similar base plate, and there is likewise a carrier pin, but that pin is displaceably disposed in the base plate of element 39 to permit shifting in the horizontal. Examples for these elements are described below with reference to FIGS. 19 through 22.

Figure 10:
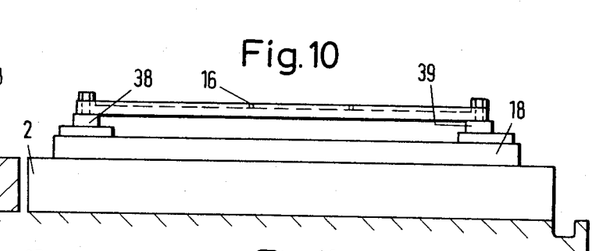
FIG. 10 is a front view of an arrangement similar to the one in FIG. 8 but illustrating different auxiliary structure on the fastener plate.
Figure 11:
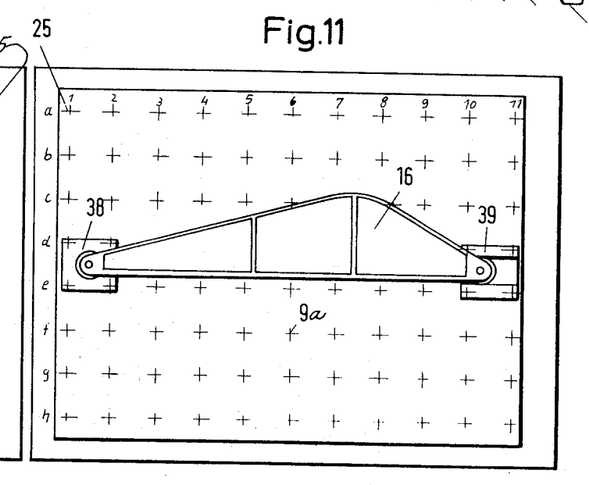
FIG. 11 is a top elevation of the arrangement shown in FIG. 10.

The embodiment of FIGS. 10 and 11 shows in particular a model or master 16 to be positioned by elements 38 and 39. The displaceability of the carrier pin in unit 39 permits adaptation of the distance between the two pins on elements 38 and 36 to the dimensions of the base plate of the two elements 38 and 39 are positioned in relation to each other by dimensions which are determined by the pattern of bores 9. Each one of the base plates of these elements 38 and 39 is four bores so that they can be bolted respectively to the bores 9a in the holding plate 18. The distance between the bolting bores in the base plates of elements 38 and 39 corresponds, of course, to the bore spacing on plate 18.

Turning now to the description of FIGS. 12 and 13, there is again illustrated fastener plate 2, and a vacuum transmission and mounting plate 19 is fastened to plate 2 by means of vacuum or low pressure suction as described.

Figure 12:
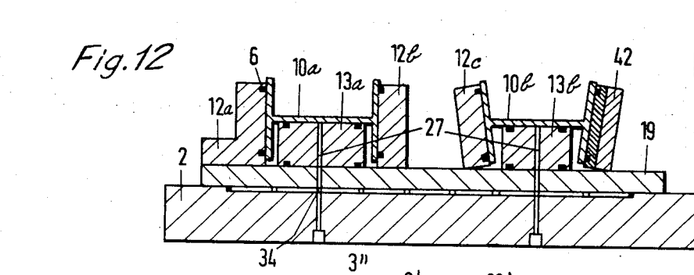
Figure 13:
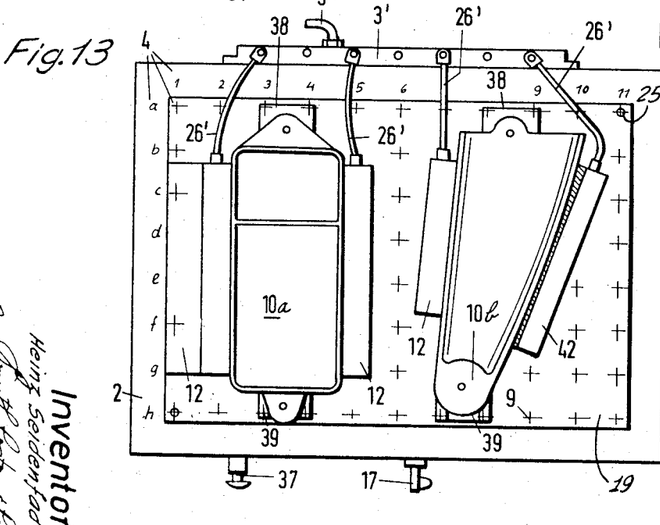

Mounting plate 19 is provided also with bores, and auxiliary fastener elements, such as 38 and 39, are bolted thereto. In addition, propping elements, such as 12a, 12b, 12c, as well as supporting elements, such as 13a and 13b, are fastened to the plate 19. These elements position a particularly profiled work piece such as double T flange pieces 10a and 10b.

As can be seen, the support and propping may have to match the contour of the work piece. A propping element 42 is also mounted on plate 19 and is provided with a curved plastic liner for matching, for example, the particularly curved contour of the one work piece 10b.

It is desirable that the work pieces are supported and maintained in position by suction. For this, each of the support elements, such as 13a and 13b, is provided with a bore 27 adapted for communication with one of the bores 34 in plate 2, there being appropriate, closable bores in mounting plate 19. The bores 27 terminate in the respective support surface as provided by the particular element. This way the vacuum, as established in duct system 3 becomes also effective in bore 27, and work pieces 10a and 10b are urged onto the respective support element 13a and 13b accordingly.

The manifold 3' of the pressure system is provided with particular outlets and openings to which hoses or other ducts 26' can be connected. These conduits, in turn, connect to suitable ducts and internal elements in the propping elements 12a, 12b etc. and 42. Each of these propping elements is provided with a particular operating face for surface-to-surface engagement with the work piece. Therefore, these respective surfaces of the propping elements are provided with a gridlike pattern of grooves and channels to which connect hoses 26' through the internal ducts of the propping elements, so that suction is established, to urge the work piece into engagement with the particular face of the respective propping element.

Additional grooves and channels are provided in the various elements 12 and 42 for receiving sealing elements 6 delineating the area that is to be in connection with the vacuum system. In other words, the operating support surface of each propping element may be a small scale replica of the surface of the principle fastening plate 2 to obtain support by suction in the same manner as plate 1a is fastened on plate 2. The support elements 13a and 13b are likewise provided with grooves and sealing strips therein to obtain fastening of work pieces in similar manner; also sealing relative to support plate 19 is provided therewith.

Figure 12A:
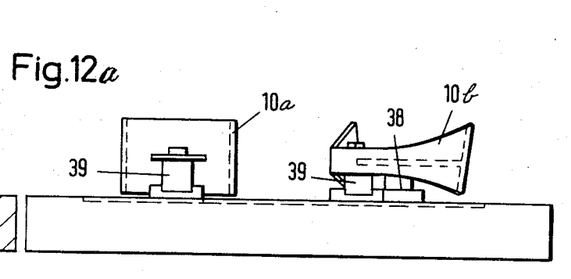
FIG. 12a is a side view of the structure similar to FIG. 12, but with different auxiliary elements.
Figure 13A:
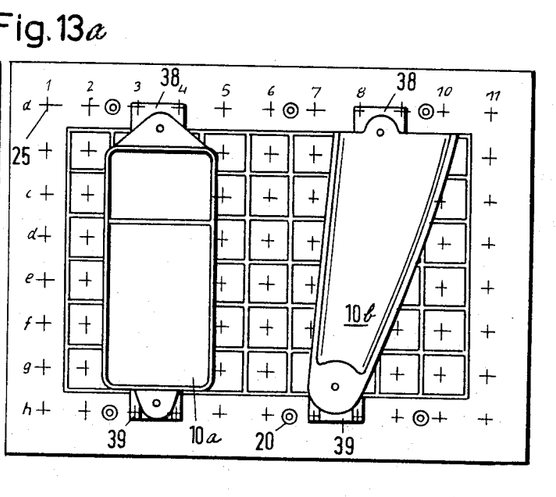

FIGS. 12a and 13a illustrate also the particular mounting elements 38 and 39 mentioned above, but for direct mounting on fastener plate 2. Work pieces 10a and 10b are positioned and supported by these elements, directly on fastener plate 2, without propping and additional support elements.

Figure 14:
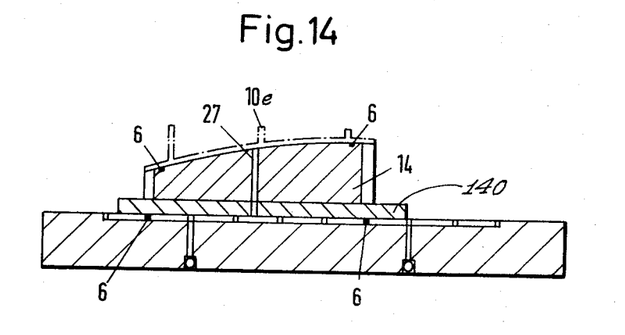
FIG. 14 is a section view through a support plate with still different auxiliary fastening and positioning equipment.
Figure 15:
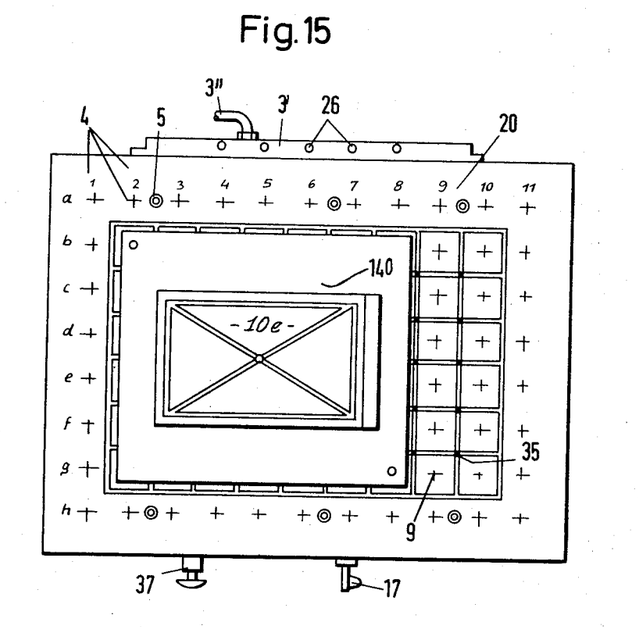
FIG. 15 is a top elevation of the device shown in FIG. 14.

Proceeding to the description of FIGS. 14 and 15, there is illustrated again the fastener plate 2, on which is mounted a particularly contoured work piece holder 14. The holder has a base plate 140, which is seated on and sucked against plate 2 by means of the vacuum system as described. The top surface of holder 14 is particularly contoured for fitting engagement with a work piece 10e.

Holder 14 is provided with a bore 27 which communicates with the cavity defined between the sealed off portion underneath the base plate 140. Suitable grooves and channels are provided on the contoured surface of holder block 14 including grooves along the edges thereof to receive sealing elements 6, analogous to sealing elements in channels 5 of plate 2. Bores 34 of the fastening plate are again plugged by means of plugs 35 and to the extent that they are not covered by the particular holder base 140. Thus, as base 140 is fastened to plate 2 by suction, work piece 10e is urged into snug engagement with the contoured operating face of block 14.

Figure 16:
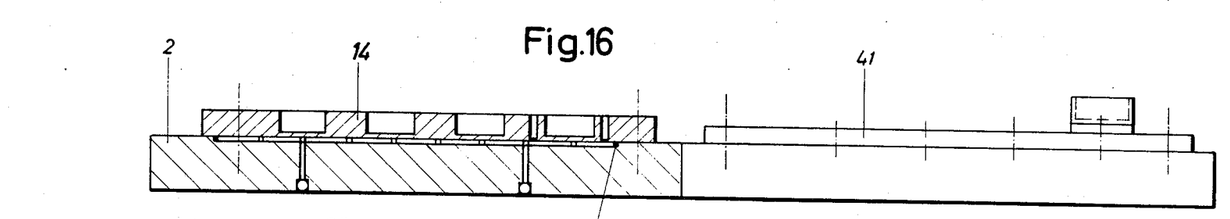
FIG. 16 is partially a section, partially a side elevation of two fastener plates with different auxiliary equipment.
Figure 17:
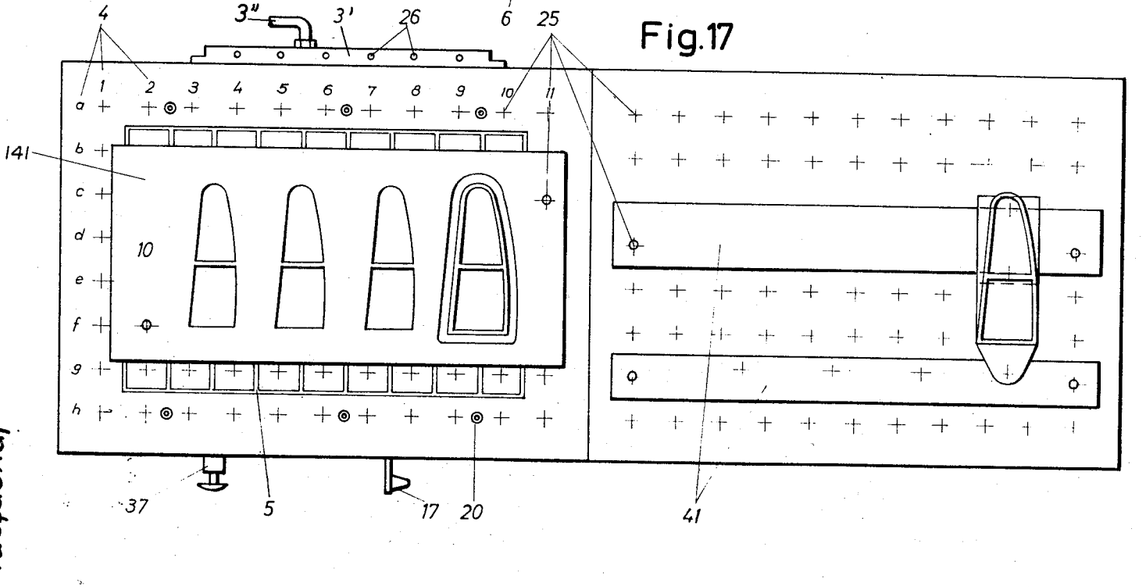
FIG. 17 is a top elevation of the device shown in FIG. 16.

The example illustrated in FIGS. 16 and 17 show two fastener plates 2 as aforedescribed and in side by side position. These two plates may be bolted to a common table for cooperation, for example, with a copying or duplicating milling machine. A master is to be positioned on the right hand plate, the copier milling tool works on work pieces on the left hand fastener plate. Thus, the left hand plate 2 supports a particular work piece 141, seated thereon and fastened thereto by low pressure suction as aforedescribed. Additionally, work piece 141 may be bolted to peripheral bores 25 of fastener plate 2, near the work piece edges. Work piece 141 is shown with cutouts in various stages.

The right hand portions of FIGS. 16 and 17 show similar fastener plates and a particular set of supporting bars 41 are seated on the plate 2 and fastened thereto by suction or by means of bolting. The bars 41 serve as holders for a model or master, to be copied by milling. The master, for example, is scanned as to its contour and a machine tool (not shown) is controlled to duplicate the contour of that master in work piece 141.

The support bars 41 are provided with bores which, in turn, serve for bolting the master to the bars. The support bars 41 may be provided with several of these position-defining and fastening bores to permit various positions for the master. These bores do not have to correspond to the pattern of bores 9 in the fastener plate. The model or master may itself be mounted on a particular base plate provided, for example, with pins which are inserted into the positioning poles in bars 31. This way, the model can very easily be positioned and its position can readily be changed.

Figure 18:
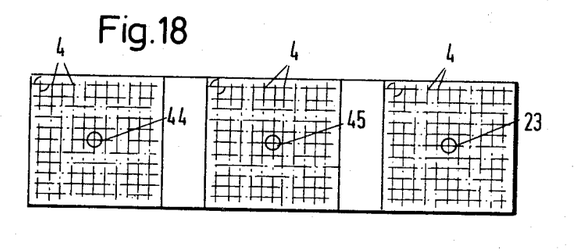
FIG. 18 shows somewhat schematically the planning layout for a two spindle copy milling machine.

As illustrated in FIG. 18, the vacuum fastener plates in accordance with the present invention can be used in a two spindle copier milling machine. For this, spindle axes 44 and 45, as well as the scanning axis 23, are centered to a zero position in the respective center of each of the several coordinate systems 4 as defining the bores 9 in each fastener plate. This way the several units for supporting the individual work pieces correspond to the position of model or sample in relation to the spindle axis as well as to the scanning axis 23. Further operation proceeds from there.

FIGS. 19 through 26 illustrate additional positioning and mounting elements which can selectively be placed on or attached to a fastener plate 2 or table 1' to provide particular capability for positioning particularly shaped work pieces. In essence, these elements have a vertically extending fastener pin or shaft which axis thereof is to be particularly positioned on the table. The element shown in FIGS. 19 and 20 may be of the type shown somewhat schematically as mounting element 38, for example, in FIGS. 8, 10, 13 etc.

Figure 19:
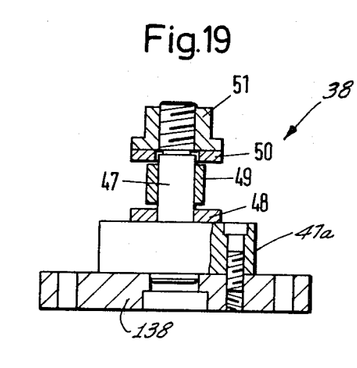
FIGS. 19 and 21 are section views of auxiliary units employed to define a stationary point on a fastener plate.
Figure 20:
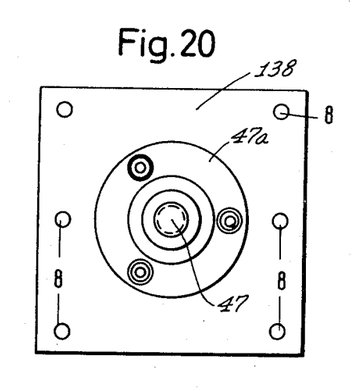
FIGS. 20 and 22, respectively, are top views of the devices shown in FIGS. 19 and 21.

The mounting element has a base plate 138 provided with corner bores 8 spaced apart in correspondence to the spacing of the bores 9 on fastener plate 2 on table 1. There may be additional bores 8 in between the corner bores to provide for additional fastening capabilities of the element using auxiliary bores in the fastener plate. A positioning pin 47 is provided in the center of a cylindrical mounting block 47a, which is bolted to base plate 138a.

Figure 21:
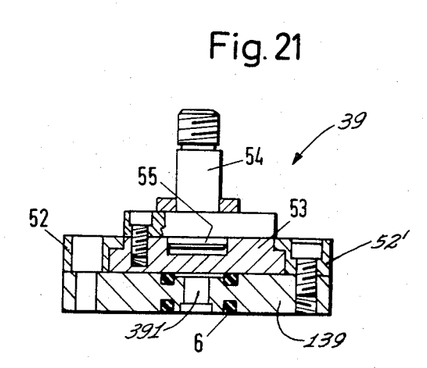
Figure 22:
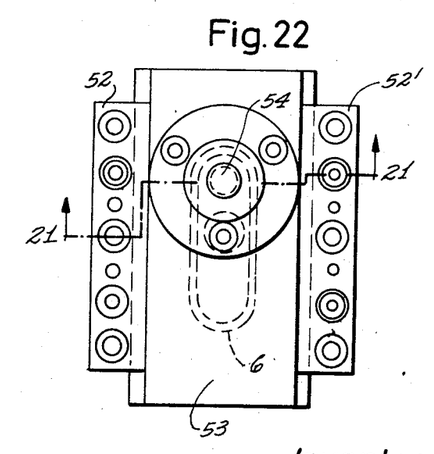

A washer 48 is slipped over the pin 47, and spacer sleeve 49 is likewise received by the pin. Another washer or annulus 50 sits on that sleeve and a nut 51 tightens the entire assembly together. The object to be positioned is, thus, fastened by and clamped between washers 48 and 50. Alternatingly, that object may merely be retained, so as to inhibit lateral displacement. A different auxiliary positioning and mounting element is shown in FIGS. 21 and 22. This element may be used, for example, as mounting element 39 in the previous figures. Again there is a base plate 13g provided with bores, the pattern thereof following the pattern of bores 9 of fastener plate 2. Suitable grooves or channels are provided in the base plate to receive sealing 6.

The sealing circumscribes a bore 391 that may become located above an unplugged bore 34 on a fastener plate 2 or table 1. The lower sealing prevents lateral influx of air along the bottom of plate 139. The upper sealing provides suction, for fastening and positioning a slide element 53.

A pair of guide rails 52 and 52' is attached to base plate 139 and secured thereto by suitable set screws. The guide rails are provided to guide slide element 53 and permitting displacement thereof along the extension of the rails. Slide element 53 carries a receiver and positioning pin 54 by means of positioning structure 55. The oblong contour of sealing 6 delineates the range of fastening slide 53 by suction against the bolted base 139. As pin 54 is eccentric in relation to the center of slide 53, the adjusting range can be doubled simply by turning the device by 180°. In each position, the adjusting range covers about half of the spacing between corner bores of the base plate 139.

The auxiliary mounting element 38 of FIGS. 19 and 20 defines a particular point (or position of a vertical axis) when bolted to a fastener plate. The element 39 of FIGS. 21 and 22 defines a positioning pin axis that can be displaced in one direction to define any position within the distance of two corner bores that may register with two bores 9 when bolted to a fastener plate 2 or table 1. The auxiliary mounting element, shown in FIGS. 23 and 24, permits such position adjustment along both directions of the coordinate system 4 defined by the matrix bore pattern on a fastener plate.

Figure 23:
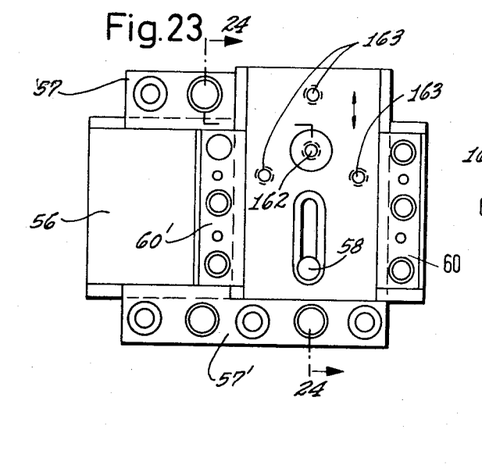
FIG. 23 is a top view of other auxiliary equipment for the plate of the present invention.
Figure 24:
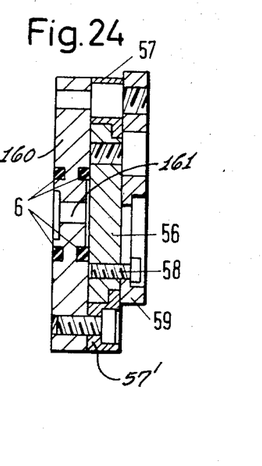
FIG. 24 is a section view along lines 24—24 in FIG. 23.

The particular mounting element is provided with a base plate 160 having a corner bore pattern matching the bore pattern of bores 9 as outlined above. Additionally, there are provided channels for receiving sealing 6. An intermediate, flat carrier 56 is maintained on base plate 160 by means of guide rails 57 and 57', which are bolted to the base plate by means of set screws. That carrier 56 is, thus, displaceable along a first axis. The carrier 56 is fastened to base plate 160 by suction as aforedescribed and sealing about bore 161 delineates the adjusting range; the bore 161 itself is provided for sealed communication with a bore 37 of the aforedescribed fastener plate 2 or table 1.

Carrier 56 has a threaded bore arranged eccentric to its own center and outside of the area of sealing and suction, to receive a guide pin 58. A carriage 59, having an oblong slot, is disposed on the intermediate carrier 56, and the oblong slot is traversed by guide pin 58. Carriage 59 is disposed for movement along an axis tranversely to the axis of displacement of carrier 56. Guide bars 60 and 60' are secured to carrier 56 by means of set screws for defining a displacement path for carriage 59. Additionally, the cross slide is provided with a central bore 162 and threaded bore holes 163 to receive an exchangeable receiver and mounting pin of the type shown in FIGS. 19 through 22.

The displacement path of carriage 59 is limited by the longitudinal dimensions of the oblong slot, and by the guide pin as projecting therethrough. The oblong slot may have length about half the distance of the corner bores of base 160, which, in turn, is equal to the coordinate unit spacing of bores 9 in a principle fastener plate 2 or table 1. If the unit as a whole is turned by 180°, or if the carriage is turned around 180°, the adjusting path is doubled along both axes. It follows from the foregoing, that this particular mounting element has two components that are slidable in two different directions to permit positioning adjustment along two different coordinating, and in a plane of placement of that element as a whole. This way, any point within a square as defined by four bores 9 of the array can be defined, in essence, as the position of the vertical axis through bore 162.

Figure 25:
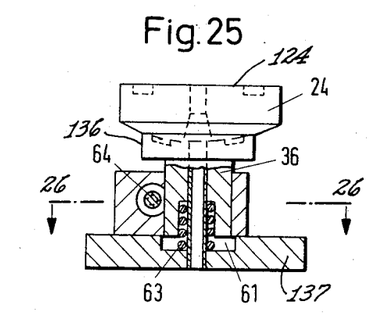
FIG. 25 is a height adjustable, universally pivoted vacuum operated fastener unit, partially shown in section.
Figure 26:
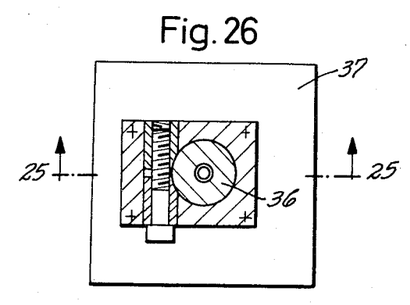
FIG. 26 is a section view shown along lines 26—26 in FIG. 25.

Another auxiliary mounting and positioning element is shown in FIGS. 25 and 26. There is a carrier pin 36 disposed for displacement in an oblong slot 61 in a base plate 137. Pin 36 has a head 136, the upper surface of which has spherical configuration for support of and engagement with a spherical surface of a universally pivotable carrier 24. The carrier 24, thus, can be adjusted at oblique angles of its operating face 124 and within the range defined by its extensions. Base plate 137 supports pin 36 as well as the head 136 and the carrier 24 thereon, are traversed by communicating bores. That duct is to be connected to the vacuum system operating the fastener plate 1 or 2, or to the manifold of vacuum system itself. This way suction pressure can be provided to the operating and support surface 124 of carrier plate 24, to extend the suction operation beyond the surface of plate 1 or 2 on which the mounting element is disposed. The bore in pin 36 has a widened portion for receiving a spring 63 which bears against the base plate as well as against an annular ledge in pin 36. A bi-parted sleeve 64 and a fastening screw therein is provided for arresting the vertical position of pin 36 after the height of carrier 24 has been adjusted.

The invention is not limited to the embodiments described above but all changes and modifications thereof not constituting departures from the spirit and scope of the invention are intended to be included.

I claim:

1. Arrangement for fastening work pieces or work piece receiving elements to a plate pertaining to or secured to a machine tool table or the like, comprising:
    means defining a first plurality of open channels, and a second plurality of open channels in one of the flat surfaces of the plate, the channels of the first plurality intersecting the channels of the second plurality; there being an array of intersections accordingly;
    means for defining a plurality of first bores, located in between the channels and having equidistant spacing in each of the two directions as defined by the channels of the two pluralities, the first bores provided for indexing and/or bolting of auxiliary equipment to the plate in particular mutual spatial relation;
    means defining a duct system in the plate and including a plurality of second bores communicating with the channels of the pluralities at the intersections thereof;
    means for closing a first plurality of the second bores;

sealing means for placement in selected channels to delineate a plurality of areas of the plate and defining a sealingly closed boundary for each area around the second bores of the first plurality, outside of the area, at least some of the second bores within the delineated area being not closed, the sealing means in a channel projecting above the open edge of the channel;

means connected for selectively providing low suction pressure to the duct system to be effective above the plate within the delineated area, so that an object placed on the projecting sealing means is urged into sealing engagement therewith and held by low pressure suction underneath and within the delineation of said area;

a plurality of base elements, each supporting a work piece mounting, indexing and positioning element, each base element having bores for registration with particular ones of the first bores, the base elements being bolted to and indexed with particular ones of the first bores, so that the mounting and positioning elements on the base elements assume relative position as determined by the spatial relation between the bores of the first plurality; and at least one of the base elements of the plurality including a slide for the respective mounting element and being slideably disposed in the respective base element for sliding in the plane of the surface of the plate, the one base element having a base traversed by a bore circumscribed by channels for receiving sealing means, the bore registering with a bore of the second plurality in an intersection of two channels of the two pluralities and in one of the areas of the plurality, the slide for the mounting element being sucked against the base positioning the slide, the base elements as bolted directly to the plate located each within a delineated area.

2. Fastening arrangement as in claim 1, the base elements bolted directly to the plate through bores of the first plurality and having bores that can be made to register with a bore of the second plurality within a delineated area.

3. Fastening arrangement as in claim 1, the mounting elements being pins removably disposed on the respective base elements and slide.

4. Fastening arrangement as in claim 1, the slide comprised of a cross slide to permit adjustment of the mounting and positioning element along the two directions, the cross-slide having first and second transverse slide elements, with a pin in the first and an oblong guide slot, supporting, holding and positioning element in the second slide element, the first slide element sliding in rails of the base.

5. Fastening arrangement as in claim 1, the plate comprised of a plastic material, provided with indentations, there being metal inserts in the indentations defining the additional bores.

6. Fastening arrangement as in claim 5, the adjacently placed inserts defining the channels in between them.

7. Fastening arrangement as in claim 1, including an additional mounting element for securing to the plate and having duct means for connection to the lower pressure system to receive therefrom low suction pressure, the additional mounting element having particularly contoured surface, with channels communicating with the low pressure system, to permit suction engagement with a complementary contoured work piece, as held by the mounting elements on the bolted base elements of the plurality.

8. Fastening arrangement as in claim 1, an additional mounting element having a head with a concave-calotte shaped support surface and a convex-calotte shaped carrier for supporting the carrier on the head for tilting in two different directions, the carrier, the head and the support provided for communication with the suction system.

9. Fastening arrangement as in claim 1, the plate having additional bores outside of the pattern as defined by the channels of the pluralities.

10. Fastening arrangement as in claim 1, the plate provided with plungers for selective projection above the surface of the plate, so as to facilitate removal of an object from plate.

11. Fastening arrangement as in claim 1, comprising an auxiliary fastening means including a base having upper and lower surface and a bore for communication with an unplugged bore of the first plurality, through the base between upper and lower surface; and sealing means at the upper and lower surfaces, circumscribing the bore, the upper surface provided as auxiliary support and for suction-fastening above the plane of the plate.

12. Fastening arrangement as in claim 11, the auxiliary fastening means disposed on an auxiliary plate serving as object to be fastened on the first mentioned plate, upper and lower surface of the base provided with open channels circumscribing the respective bore openings and receiving sealing means.

13. Fastening arrangement as in claim 11, the auxiliary fastening means serving itself as object to be fastened on the first mentioned plate.

14. Fastening arrangement as in claim 11, the base bolted to the first plate, through bores of the first plurality, the upper surface of the base providing support for an object to be fastened thereto by suction.

15. Arrangement for fastening work pieces or work piece receiving elements to a plate pertaining to or secured to a machine tool table or the like, comprising:

means defining a first plurality of open channels, and a second plurality of open channels in one of the flat surfaces of the plate, the channels of the first plurality intersecting the channels of the second plurality, there being an array of intersections accordingly;

means for defining a plurality of first bores, located in between the channels and having equidistant spacing in each of the two directions as defined by the channels of the two pluralities, the first bores provided for indexing and/or bolting of auxiliary equipment to the plate in a particular spaced relationship;

means defining a duct system in the plate and including a plurality of second bores communicating with the channels of the pluralities at the intersections thereof;

means for closing a first plurality of the second bores;

sealing means for placement in selected channels to delineate an area of the plate and defining a closed boundary for the area around the second bores of the first plurality, outside of the area; at least some of the second bores within the delineated area being not closed, the sealing means in a channel projecting above the open edge of the channel;

means connected for selectively providing low suction pressure to the duct system to be effective above the plate within the delineated areas, so that an object placed on the projecting sealing means is urged into sealing engagement therewith and held by low pressure suction underneath and within the delineation of said area; an additional plate sucked against said surface as object and having indexing an bolting bores corresponding to said first bores, and having an upper and lower surface and a bore for communication with an unplugged bore of the first plurality;

a plurality of base element supporting a work piece mounting, indexing and positioning element, each base element having bores for registration with and being bolted to particular ones of the bores of the additional plate, so that the mounting and positioning elements on the base elements assume relative position as determined by the spatial relation between the bores of the first plurality; and an additional mounting element having upper and lower surface and a bore circumscribed by the upper and lower surface channels for receiving sealing means, the bore registering with the bore of the additional plate, the upper surface of the one base element having particularly contoured upper surface for suction of a complementary contoured work piece against the particularly contoured surface for additional support; the work piece being held and mounted by mounting elements respectively for bolted base elements of the plurality, thereby mounting the work piece in indexed position and as additionally supported by the additional mounting element.

16. Arrangement for fastening work pieces or work piece receiving elements to a plate pertaining to or secured to a machine tool table or the like, comprising:

means defining a first plurality of open channels, and a second plurality of open channels in one of the flat surfaces of the plate, the channels of the first plurality intersecting the channels of the second plurality; there being an array of intersections accordingly;

means for defining a plurality of first bores, located in between the channels and having equidistant spacing in each of the two directions as defined by the channels of the two pluralities, the first bores provided for indexing and/or bolting of auxiliary equipment to the plate in particular mutual spatial relation;

means defining a duct system in the plate and including a plurality of second bores communicating with the channels of the pluralities at the intersections thereof;

means for closing a first plurality of the second bores;

sealing means for placement in selected channels to delineate at least one area of the plate and defining a closed boundary for the area around the second bores of the first plurality, outside of the area, at least some of the second bores within the delineated area being not closed, the sealing means in a channel projecting above the open edge of the channel;

means connected for selectively provided low suction pressure to the duct system to be effective above the plate within the delineated area, so that an object placed on the projecting sealing means is urged into sealing engagement therewith and held by low pressure suction underneath and within the delineation of said area;

a plurality of base elements, each supporting a work piece mounting, indexing and positioning element, each base element having bores for registration with particular ones of the first bores, the base elements being bolted to and indexed with particular ones of the first bores, so that the mounting and positioning elements on the base elements assume relative position as determined by the spatial relation between the bores of the first plurality; and an additional mounting element for securing to the plate, the additional mounting element having a head with a concave-calotte surface and a carrier with a convex-calotte surface mounted therewith on the head for tilting the carrier on the head in two different directions, the carrier having a particular surface, the mounting element having duct means for connection to the suction system to receive therefrom low suction pressure, the carrier having channels in its particular surface communicating with the duct means for suction engagement of the surface with complementary surface of a work piece.

* * * * *